United States Patent
Sharma et al.

(10) Patent No.: US 12,212,799 B2
(45) Date of Patent: *Jan. 28, 2025

(54) LOW-LATENCY MEDIA STREAMING INITIALIZATION

(71) Applicant: DISH Network Technologies India Private Limited, Karnataka (IN)

(72) Inventors: Deepak Sharma, Bangalore (IN); Vimalraj Ganesan, Bangalore (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,996

(22) Filed: Dec. 1, 2023

(65) Prior Publication Data

US 2024/0223831 A1    Jul. 4, 2024

Related U.S. Application Data

(63) Continuation of application No. 18/168,769, filed on Feb. 14, 2023, now Pat. No. 11,863,810.

(30) Foreign Application Priority Data

Dec. 29, 2022   (IN) .............................. 202241076803

(51) Int. Cl.
H04N 21/2662    (2011.01)
H04N 19/114     (2014.01)
H04N 21/258     (2011.01)

(52) U.S. Cl.
CPC ....... H04N 21/2662 (2013.01); H04N 19/114 (2014.11); H04N 21/25891 (2013.01)

(58) Field of Classification Search
CPC ................................................ H04N 21/25891
See application file for complete search history.

(56) References Cited

U.S. PATENT DOCUMENTS

| | | |
|---|---|---|
| 2022/0210242 A1 | 6/2022 | Bromand et al. |
| 2022/0248074 A1* | 8/2022 | Regunathan ....... H04N 21/2402 |
| 2022/0286527 A1 | 9/2022 | Brisebois |
| 2022/0337893 A1 | 10/2022 | He et al. |
| 2023/0188790 A1* | 6/2023 | Mayhew ........ H04N 21/440218 |
| | | 709/219 |
| 2023/0237006 A1 | 7/2023 | Hofverberg et al. |
| 2024/0223637 A1* | 7/2024 | Gordon .................. H04L 67/02 |

* cited by examiner

*Primary Examiner* — Clayton R Williams
(74) *Attorney, Agent, or Firm* — Kilpatrick Townsend & Stockton LLP (57) ABSTRACT

A method for media content streaming includes: receiving a command to start playback of a first media content item, wherein a first portion of the first media content item has been transcoded to generate at least one passive adaptive streamlet, and the first portion of the first media content item starts at a playback position and ends at an optimal transition point; outputting, by a content streaming device, one of the at least one passive adaptive streamlet; while outputting the one of the at least one passive adaptive streamlet, requesting, receiving, and transcoding a second portion of the first media content item to generate an active adaptive streamlet of the first media content item, wherein the active adaptive streamlet starts at the optimal transition point of the first media content item; and immediately following outputting the one of the at least one passive adaptive streamlet, outputting the active adaptive streamlet of the first media content item.

20 Claims, 4 Drawing Sheets

LOW-LATENCY MEDIA STREAMING INITIALIZATION

CROSS-REFERENCE TO RELATED APPLICATIONS

This application is a continuation of U.S. Non-Provisional patent application Ser. No. 18/168,769, filed on Feb. 14, 2023, which claims priority to Indian Provisional Patent Application Serial No. 202241076803 filed on Dec. 29, 2022, in the Indian Intellectual Property Office, the disclosures of which are hereby incorporated by reference in their entirety for all purposes.

BACKGROUND

Viewers commonly receive their television programming through cable, direct broadcast satellite (DBS), IPTV, or similar subscription-based services. The television service may be broadcast from cable, DBS, or other content aggregators to multiple subscribers. The subscribers may then view received content as live broadcasts and/or store the content on digital video recorders (DVRs), Set-Top Boxes (STBs) having integrated DVRs, cloud servers, or the like for later viewing.

"Streaming" refers to the technology that delivers media content at a rate sufficient for presenting the media content to a user in real-time as the data is received. The data may be stored in a memory device temporarily until played and then subsequently deleted. The user has the immediate satisfaction of viewing the requested media content without waiting for the media content to be downloaded entirely. However, for streaming over a network, the audio/video quality that can be received for real-time presentation is constrained by the available bandwidth of the user's network connection. Streaming may be used to deliver content on demand or from live broadcasts.

Network conditions, however, are not always ideal for a viewer. Poor network conditions (sometimes also referred to as "flaky network conditions") characterized by, for example, high latency, high packet loss, low bandwidth, and the like may result in discontinuity, buffering during streaming, poor video quality with low video resolution, and a long start delay of the playback of media contents. Therefore, there remains a desire to provide systems and methods that allow for low-latency streaming start and smooth playback in poor network conditions.

SUMMARY

Various arrangements for low-latency media streaming initialization are presented. One general aspect includes a method for media content streaming. The method includes determining, from a plurality of media content items, a plurality of predicted media content items and a plurality of playback positions corresponding to the plurality of predicted media content items, based on history data of a user. The method also includes transcoding a portion of each of the plurality of predicted media content items to generate multiple passive adaptive streamlets for each of the plurality of predicted media content items at different bitrates, where: the portion of each of the plurality of predicted media content items starts at the corresponding playback position and ends at an optimal transition point. The method also includes receiving a command to start playback of a first predicted media content item selected from the plurality of predicted media content items. The method also includes outputting, by a content streaming device, a first passive adaptive streamlet selected from the multiple passive adaptive streamlets of the first predicted media content item. The method also includes while outputting the first passive adaptive streamlet, requesting, receiving, and transcoding a second portion of the first predicted media content item to generate an active adaptive streamlet of the first predicted media content item, where: the active adaptive streamlet starts at the optimal transition point of the first predicted media content item. The method also includes immediately following outputting the first passive adaptive streamlet, outputting, by the content streaming device, the active adaptive streamlet of the first predicted media content item. Other embodiments of this aspect may include corresponding computer systems, apparatus, and computer programs recorded on one or more computer storage devices, each configured to perform the actions of the methods.

Implementations may include one or more of the following features. The multiple passive adaptive streamlets for each of the plurality of predicted media content items are at least three passive adaptive streamlets for each of the plurality of predicted media content items. The at least three passive adaptive streamlets for each of the plurality of predicted media content items are three passive adaptive streamlets corresponding to a last streamed bitrate, a first bitrate having a lower bitrate than an average bitrate, and a second bitrate having a greater bitrate than the average bitrate. The first passive adaptive streamlet of the first predicted media content item corresponds to the last streamed bitrate. The first passive adaptive streamlet of the first predicted media content item corresponds to the first bitrate. The first passive adaptive streamlet of the first predicted media content item corresponds to the second bitrate. The optimal transition point for each of the plurality of predicted media content items is determined based at least on a group of pictures (GOP) boundary and an i-frame of each of the plurality of next possible media content items. The optimal transition point is a next immediate I-frame. A duration of a period between the playback position and the optimal transition point for each of the plurality of predicted media content items is greater than a predetermined threshold. The predetermined threshold is determined based on network conditions. The second portion of each of the plurality of predicted media content items are transcoded by one or more transcoders of a television receiver when the one or more transcoders are idle. The metadata is used when generating the active adaptive streamlet of the first predicted media content item. The plurality of predicted media content items and the plurality of playback positions are determined using machine learning. The history data of the user may include one or more of the following: watch history; favorite genre; favorite program; favorite media content item provider; and playback pause positions. Implementations of the described techniques may include hardware, a method or process, or computer software on a computer-accessible medium.

Another general aspect includes a system for media content streaming. The system also includes a storage medium storing a plurality of media content items. The system also includes a decoder module. The system also includes a content streaming device. The system also includes one or more processors, where the system is configured to: determine, from the plurality of media content items, a plurality of predicted media content items and a plurality of playback positions corresponding to the plurality of predicted media content items, based on history data of a user; transcode, by the decoder module, a portion of each of the plurality of predicted media content items to generate multiple passive adaptive streamlets for each of the plurality of predicted media content items at different bitrates, where: the portion of each of the plurality of predicted media content items starts at the corresponding playback position and ends at an optimal transition point; receive a command to start playback of a first predicted media content item selected from the plurality of predicted media content items; output, by the content streaming device, a first passive adaptive streamlet selected from the multiple passive adaptive streamlets of the first predicted media content item; while the first passive adaptive streamlet is output, transcode, by the decoder module, a second portion of the first predicted media content item to generate an active adaptive streamlet of the first predicted media content item, where: the active adaptive streamlet starts at the optimal transition point of the first predicted media content item; immediately following outputting the first passive adaptive streamlet, output, by the content streaming device, the active adaptive streamlet of the first predicted media content item. Other embodiments of this aspect may include corresponding computer systems, apparatus, and computer programs recorded on one or more computer storage devices, each configured to perform the actions of the methods.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Media content items, such as video and/or audio content items, can be stored on a content storage device, such as a television receiver before they are output by a content streaming device. Although a television receiver is used as an example, it should be understood that the techniques discussed herein are generally applicable to other types of devices, such as smart TVs, cell phones, tablets, laptops, desktops, gaming consoles, and the like. Even though these media content items are recorded and stored locally, it takes some time to start streaming these media content items on the content streaming device. Engaging transcoders for adaptive streaming may delay the start of streaming and result in high latency. A long start delay and high latency may significantly impair viewer experience.

Transcoding media content items in advance and storing them on the content storage device might be considered a solution. The same media content item may be transcoded, and multiple copies of the same media content item characterized by multiple bitrates are generated and stored. However, the memory size of the content storage device is not unlimited. Transcoding and storing media content items with multiple bitrates is not feasible, if not impossible, given the limited memory size. In addition, the computation capability of a processing unit, such as one or more processors of the content storage device may be another bottleneck. Thus, transcoding and storing media content items with multiple bitrates is practically challenging.

Thus, it is desired to provide methods and systems that can allow for a low-latency streaming start and smooth playback even in poor network conditions. Embodiments detailed herein are directed to methods and systems featuring a smooth transition from passive adaptive streaming to active adaptive streaming. Such a smooth transition can allow a low-latency streaming start by transcoding a portion of some predicted media content items in advance. Multiple passive adaptive streamlets characterized by multiple bitrates are generated for each of the predicted media content items. These passive adaptive streamlets are stored on the content storage device. Once a command is received from the viewer to start the playback of one of the predicted media content items, one of the multiple passive adaptive streamlets for the selected predicted media content item is output by a content streaming device. As the selected passive adaptive streamlet has been transcoded and stored in advance, the long start delay can be avoided even in poor network conditions.

While the selected passive adaptive streamlet is played, an active adaptive streamlet of the selected predicted media content item is being transcoded. The active adaptive streamlet starts at an optimal transition point, where the corresponding passive adaptive streamlet ends. No portion of the selected predicted media content item is missed from playback. Immediately after the selected passive adaptive streamlet is output, the active adaptive streamlet is output by the content streaming device. In some embodiments, the playback duration of the selected passive adaptive streamlet is longer than a predetermined threshold such that the transcoder has enough time to start the transcoding of the active adaptive streamlet. As such, playback can begin relatively sooner than if the passive adaptive streamlet was not present. Details of the methods and systems featuring a smooth transition from passive adaptive streaming to active adaptive streaming will be discussed below with reference to FIGS. 1-4.

Although streaming is described throughout the description as from a local server such as television receiver to content streaming device over, for example, Wi-Fi, it should be understood that this is exemplary rather than limiting. The techniques discussed herein are also applicable to other streaming arrangements or architectures. In one example, streaming is from a remote server, such as a content server system, to content streaming device over internet. In another example, streaming is from a local server such as television receiver to a third-party server, which relays or transfers data to content streaming device. This arrangement can be used when content streaming device is not able to be connected directly to the local server.

Figure 1:
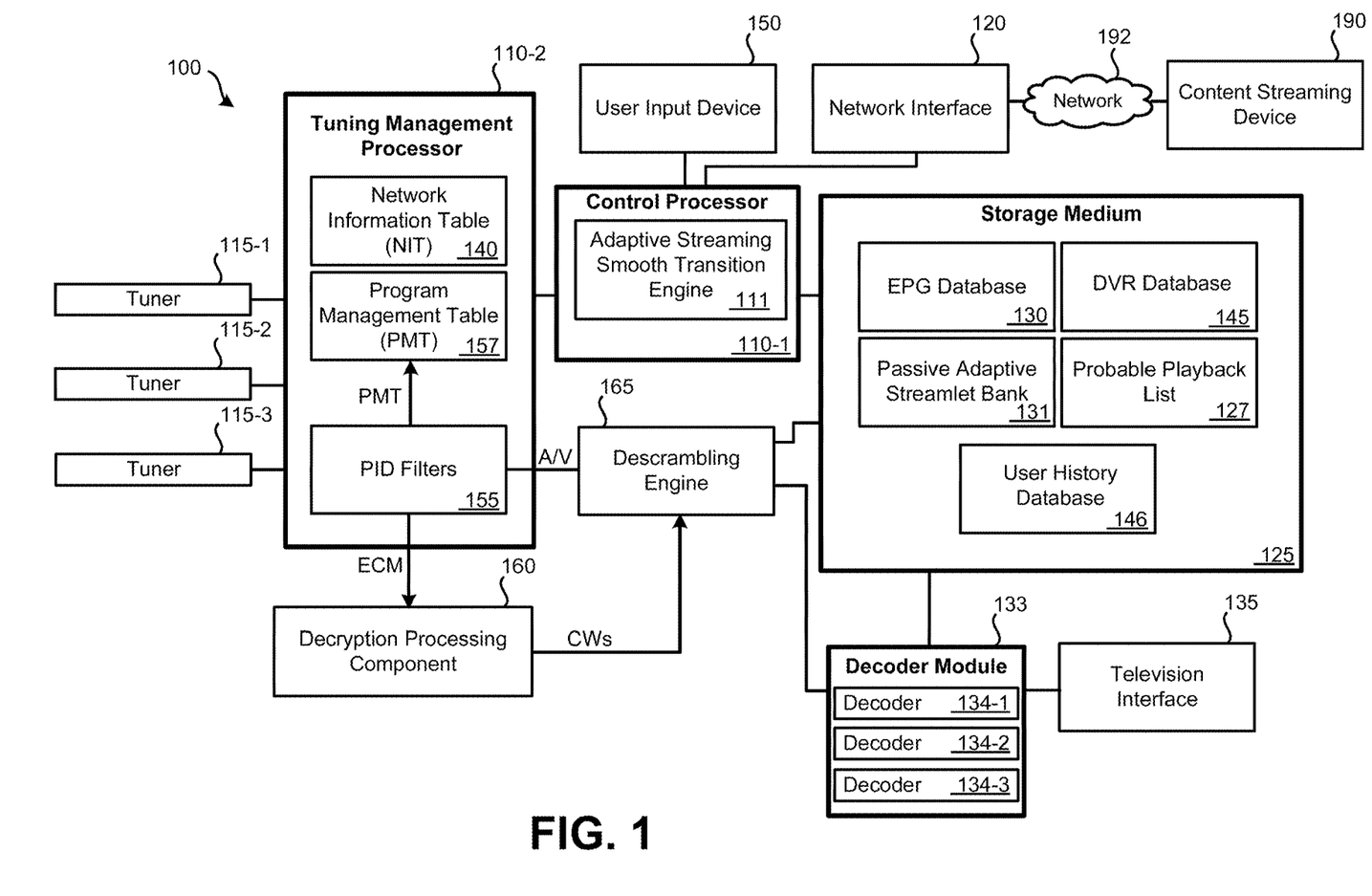
FIG. 1 illustrates an embodiment of a television receiver.

FIG. 1 illustrates an embodiment of a television receiver 100. Although a television receiver is used as an example, it should be understood that the techniques discussed herein are generally applicable to other types of devices, such as smart TVs, cell phones, tablets, laptops, desktops, gaming consoles, and the like.

In some embodiments, television receiver 100 may receive live television programming broadcasted by a television service provider system. "Live" television programming refers to television programming that is transmitted substantially contemporaneously with the event occurring. Live television programming may include a delay of up to several minutes. For instance, a sporting event that is broadcast with a delay of up to a few minutes would qualify as live television programming. Such live television programming may be received from various content providers, then relayed by the television service provider system to television receiver 100. Streams of many television channels may be broadcast live via various types of television programming distribution networks, such as a satellite-based network, cable-based network, IP-based network, or over-the-top (OTT) television distribution network, which may operate using an Internet connection. In addition to streaming live television channels, television service provider system may transmit on-demand content to television receivers 100, applications for execution, electronic programming guide (EPG) data, metadata, and other services ancillary to live television programming.

Television receiver 100 may be in the form of a separate device configured to be connected with a display device, such as a television. Embodiments of television receiver 100 can include set top boxes (STBs). In addition to being in the form of an STB, a television receiver may be incorporated as part of another device, such as a television or other form of display device. For example, a television may have an integrated television receiver (which does not involve an external STB being coupled with the television).

Television receiver 100 may include: processors 110 (which may include control processor 110-1, tuning management processor 110-2, and possibly additional processors), tuners 115, network interface 120, non-transitory computer-readable storage medium 125, electronic programming guide (EPG) database 130, television interface 135, networking information table (NIT) 140, digital video recorder (DVR) database 145 (which may include provider-managed television programming storage and/or user-defined television programming), probable playback list 127, passive adaptive streamlet bank 131, user history database 146, user input device 150, decryption processing component 160 (which can be in the form of a removable or non-removable smartcard), and/or descrambling engine 165.

In other embodiments of television receiver 100, fewer or greater numbers of components may be present. It should be understood that the various components of television receiver 100 may be implemented using hardware, firmware, software, and/or some combination thereof. Functionality of components may be combined; for example, functions of descrambling engine 165 may be performed by tuning management processor 110-2. Further, functionality of components may be spread among additional components; for example, PID (packet identifier) filters 155 may be handled by separate hardware from program management table 157.

Processors 110 may include one or more specialized and/or general-purpose processors configured to perform processes such as tuning to a particular channel, accessing and displaying EPG information from EPG database 130, and/or receiving and processing input from a user. For example, processors 110 may include one or more processors dedicated to decoding video signals from a particular format, such as MPEG, for output and display on a television and for performing decryption. It should be understood that the functions performed by various modules of FIG. 1 may be performed using one or more processors. As such, for example, functions of descrambling engine 165 may be performed by control processor 110-1.

Control processor 110-1 may communicate with tuning management processor 110-2. Control processor 110-1 may control the recording of television channels based on timers stored in DVR database 145. Control processor 110-1 may also provide commands to tuning management processor 110-2 when recording of a television channel is to cease. In addition to providing commands relating to the recording of television channels, control processor 110-1 may provide commands to tuning management processor 110-2 that indicate television channels to be output to decoder module 133 for output to a display device. Control processor 110-1 may also communicate with network interface 120 and user input device 150. Control processor 110-1 may handle incoming data from network interface 120 and user input device 150. Additionally, control processor 110-1 may be configured to output data via network interface 120. Control processor 110-1 may execute adaptive streaming smooth transition engine 111. Adaptive streaming smooth transition engine 111, when executed by control processor 110-1, may implement a process such as process 200, which will be discussed below in detail with reference to FIG. 2.

Tuners 115 may include one or more tuners used to tune to transponders that include broadcasts of one or more television channels. In the illustrated embodiment of television receiver 100, three tuners are present (tuner 115-1, tuner 115-2, and tuner 115-3). In other embodiments, two or more than three tuners may be present, such as four, six, or eight tuners. Each tuner contained in tuners 115 may be capable of receiving and processing a single transponder stream from a satellite transponder at a given time. As such, a single tuner may tune to a single transponder stream at a given time. If tuners 115 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 115 may be used to receive the signal containing the multiple television channels for presentation and/or recording. Tuners 115 may receive commands from tuning management processor 110-2. Such commands may instruct tuners 115 which frequencies or transponder streams to tune. Although receiving streams from satellites is discussed above as one example, it should be understood that streams can also be received from other delivery medium for TV broadcasting, such as terrestrial antennas and cable mediums.

Network interface 120 may be used to communicate via an alternate communication channel with a television service provider, if such communication channel is available. The primary communication channel may be via satellite (which may be unidirectional to television receiver 100) and the alternate communication channel (which may be bidirectional) may be via one or more networks 192, such as the Internet. Information may be transmitted and/or received via network interface 120.

In some embodiments, network interface 120 may be configured to communicate via one or more networks 192, such as the Internet, to communicate with a content server system. The content server system may provide media content items to be requested and received by television receiver 100 through network interface 120.

In some embodiments, network interface 120 may also be configured to communicate via one or more networks 190, such as the Internet, to communicate with content streaming device 190. In some examples, network interface 120 is Ethernet or Wi-Fi interface over LAN and/or WAN. As discussed above, poor network conditions of network 190 may result in discontinuity and a long start delay of the playback of media content items on content streaming device 190. Media content streaming device 190 may be a smart TV, a cell phone, a tablet, a laptop, a desktop, a gaming console, or other types of computerized devices. Although streaming is described as from a local server such as television receiver 100 to content streaming device 190 over, for example, Wi-Fi, it should be understood that this is exemplary rather than limiting. The techniques discussed herein are also applicable to other streaming arrangements or architectures. In one example, streaming is from a remote server, such as a content server system, to content streaming device 190 over internet. In another example, streaming is from a local server such as television receiver 100 to a third-party server, which relays or transfers data to content streaming device 190. This arrangement can be used when content streaming device 190 is not able to be connected directly to the local server.

Storage medium 125 may represent one or more non-transitory computer-readable storage mediums. Storage medium 125 may include non-transitory memory and/or a hard drive. Storage medium 125 may be used to store information received from one or more satellites and/or information received via network interface 120. Storage medium 125 may store information related to EPG database 130, DVR database 145, user history database 146, passive adaptive streamlet bank 131, and/or probable playback list 127. Recorded television programs, which were recorded based on a provider- or user-defined timer may be stored using storage medium 125 as part of DVR database 145. Storage medium 125 may be partitioned or otherwise divided (such as into folders) such that predefined amounts of storage medium 125 are devoted to storage of television programs recorded due to user-defined timers and stored television programs recorded due to provider-defined timers.

EPG database 130 may store information related to television channels and the timing of programs appearing on such television channels. EPG database 130 may be stored using storage medium 125, which may be a hard drive. Information from EPG database 130 may be used to inform users of what television channels or programs are popular and/or provide recommendations to the user. Information from EPG database 130 may provide the user with a visual interface displayed by a television that allows a user to browse and select television channels and/or television programs for viewing and/or recording. Information used to populate EPG database 130 may be received via network interface 120 and/or via satellites via tuners 115. For instance, updates to EPG database 130 may be received periodically via satellite. EPG database 130 may serve as an interface for a user to control DVR functions of television receiver 100, and/or to enable viewing and/or recording of multiple television channels simultaneously.

The network information table (NIT) 140 may store information used by television receiver 100 to access various television channels. NIT 140 may be stored locally by a processor, such as tuning management processor 110-2 and/or by storage medium 125. Information used to populate NIT 140 may be received via satellite (or cable) through tuners 115 and/or may be received via network interface 120 from the television service provider. As such, information present in NIT 140 may be periodically updated. In some embodiments, NIT 140 may be locally stored by television receiver 100 using storage medium 125. Generally, NIT 140 may store information about a service provider network, such as a satellite-based service provider network. Information that may be present in NIT 140 may include: television channel numbers, satellite identifiers (which may be used to ensure different satellites are tuned to for reception of timing signals), frequency identifiers and/or transponder identifiers for various television channels. In some embodiments, NIT 140 may contain additional data or additional tables may be stored by the television receiver. For example, while specific audio PIDs and video PIDs may not be present in NIT 140, a channel identifier may be present within NIT 140 which may be used to look up the audio PIDs and video PIDs in another table, such as a program map table (PMT). In some embodiments, a PID associated with the data for the PMT is indicated in a separate table, program association table (PAT), which is not illustrated in FIG. 1. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 140 and/or PMT 157 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

While a large portion of storage space of storage medium 125 is devoted to storage of television programming, a portion may be devoted to storage of non-audio/video data, such as EPG database 130. This "other" data may permit television receiver 100 to function properly. In some embodiments, at least ten gigabytes are allocated to such other data. For example, if NIT 140 is stored by storage medium 125, it may be part of other non-video/audio data.

Decoder module 133 may serve to convert encoded video and audio into a format suitable for output to a display device. For instance, decoder module 133 may receive MPEG video and audio from storage medium 125 or descrambling engine 165 to be output to a television. MPEG video and audio from storage medium 125 may have been recorded to DVR database 145 as part of a previously recorded television program. Decoder module 133 may convert the MPEG video and audio into a format appropriate to be displayed by a television or other form of display device and audio into a format appropriate to be output from speakers, respectively. Decoder module 133 may have the ability to convert a finite number of television channel streams received from storage medium 125 or descrambling engine 165 simultaneously. For instance, each of decoders 134 within decoder module 133 may be able to only decode a single television channel at a time. While decoder module 133 is illustrated as having three decoders 134 (decoder 134-1, decoder 134-2, and decoder 134-3), in other embodiments, a greater or fewer number of decoders may be present in television receiver 100. A decoder may be able to only decode a single high definition television program at a time.

In addition, decoders 134 may transcode a portion of each of the predicted media content items to generate multiple passive adaptive streamlets at different bitrates, which are stored in passive adaptive streamlet bank 131. Decoders 134 may also transcode a remaining portion of each of the predicted media content items to generate an active adaptive streamlet. Details of passive adaptive streamlets and active adaptive streamlets will be discussed below with reference to FIGS. 2-4.

Television interface 135 may serve to output a signal to a television (or another form of display device) in a proper format (e.g., at a proper bitrate) for display of video and playback of audio. As such, television interface 135 may output one or more television channels, stored television programming from storage medium 125 (e.g., television programs from DVR database 145, information from EPG database 130) to a television for presentation.

Digital Video Recorder (DVR) functionality may permit a television channel to be recorded for a period of time. DVR functionality of television receiver 100 may be managed by control processor 110-1. Control processor 110-1 may coordinate the television channel, start time, and stop time of when recording of a television channel is to occur. DVR database 145 may store information related to the recording of television channels. DVR database 145 may store timers that are used by control processor 110-1 to determine when a television channel should be tuned to and its programs recorded to DVR database 145 of storage medium 125. In some embodiments, a limited amount of storage medium 125 may be devoted to DVR database 145. Timers may be set by the television service provider and/or one or more users of television receiver 100.

DVR database 145 may also be used to record recordings of service provider-defined television channels. Media content items may be stored in DVR database 145. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 100 via the television provider's network. For example, in a satellite-based television service provider system, data necessary to create the provider-defined timers at television receiver 100 may be received via satellite.

As an example of DVR functionality of television receiver 100 being used to record based on provider-defined timers, a television service provider may configure television receiver 100 to record television programming on multiple, predefined television channels for a predefined period of time, on predefined dates. For instance, a television service provider may configure television receiver 100 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 125 for provider-managed television programming storage.

Probable playback list 127 may include a number of predicted media content items. The predicted media content items are determined from many media content items stored on a content storage device (e.g., storage medium 125). These predicted media content items are associated with the highest likelihood of being played by the user or viewer. In one implementation, the predicted media content items are determined based on history data of the user, and the history data may be stored in user history database 146. Machine learning techniques (e.g., neural network models) can be utilized to determine the predicted media content items. History data of the user may include one or more of the following: watch history; favorite genre; favorite program; favorite media content item provider; and playback pause positions. It should be understood that history data of the user may include other types of data related to the user in other embodiments.

In some embodiments, for each of these predicted media content items, a playback position may also be determined. The playback position is associated with the highest likelihood of being the start point of the playback. For instance, the user paused at a playback position previously, this particular playback position may be the determined playback position with the highest likelihood of being the start point of the playback. In other words, the determined playback position is the previous pause position. Details of probable playback list 127, predicted media content items, and user history will be described below with reference to FIGS. 2-4.

Passive adaptive streamlet bank 131 is operable to store multiple passive adaptive streamlets, characterized by multiple bitrates, transcoded in advance for each of the predicted media content items. In one example, three passive adaptive streamlets are stored for each of the predicted media content items, and these three passive adaptive streamlets are characterized by three different bitrates, respectively. Once a command is received from the user or viewer to start the playback of one of the predicted media content items, one of the multiple passive adaptive streamlets for the selected predicted media content item is output by content streaming device 190 shown in FIG. 1. Since the selected passive adaptive streamlet has been transcoded and stored in advance, the long start delay can be avoided even in poor network conditions. Details of the passive adaptive streamlets and multiple bitrates will be described below with reference to FIGS. 2-4.

User input device 150 may include a remote control (physically separate from television receiver 100) and/or one or more buttons on television receiver 100 that allow a user to interact with television receiver 100. User input device 150 may be used to select a television channel for viewing, provide input to adaptive streaming smooth transition engine 111, view information from EPG database 130, and/or program a timer stored to DVR database 145, wherein the timer is used to control the DVR functionality of control processor 110-1. In some embodiments, it may be possible to load some or all of preferences to a remote control. As such, the remote control can serve as a backup storage device for the preferences.

Referring back to tuners 115, television channels received via satellite (or cable) may contain at least some scrambled data. Packets of audio and video may be scrambled to prevent unauthorized users (e.g., nonsubscribers) from receiving television programming without paying the television service provider. When a tuner of tuners 115 is receiving data from a particular transponder of a satellite, the transponder stream may be a series of data packets corresponding to multiple television channels. Each data packet may contain a packet identifier (PID), which, in combination with NIT 140 and/or PMT 157, can be determined to be associated with a particular television channel. Particular data packets, referred to as entitlement control messages (ECMs), may be periodically transmitted. ECMs may be associated with another PID and may be encrypted; television receiver 100 may use decryption engine of decryption processing component 160 to decrypt ECMs. Decryption of an ECM may only be possible if the user has authorization to access the particular television channel associated with the ECM. When an ECM is determined to correspond to a television channel being stored and/or displayed, the ECM may be provided to decryption processing component 160 for decryption. Although scrambled data or channels are discussed above as one example, it should be understood that the techniques disclosed herein are also applicable to fully free-to-air (FTA) channels, which are also available without scrambling.

When decryption processing component 160 receives an encrypted ECM, decryption processing component 160 may decrypt the ECM to obtain some number of control words. In some embodiments, from each ECM received by decryption processing component 160, two control words are obtained. In some embodiments, when decryption processing component 160 receives an ECM, it compares the ECM to the previously received ECM. If the two ECMs match, the second ECM is not decrypted because the same control words would be obtained. In other embodiments, each ECM received by decryption processing component 160 is decrypted; however, if a second ECM matches a first ECM, the outputted control words will match; thus, effectively, the second ECM does not affect the control words output by decryption processing component 160. Decryption processing component 160 may be permanently part of television receiver 100 or may be configured to be inserted and removed from television receiver 100.

Tuning management processor 110-2 may be in communication with tuners 115 and control processor 110-1. Tuning management processor 110-2 may be configured to receive commands from control processor 110-1. Such commands may indicate when to start/stop recording a television channel and/or when to start/stop causing a television channel to be output to a television. Tuning management processor 110-2 may control tuners 115. Tuning management processor 110-2 may provide commands to tuners 115 that instruct the tuners which satellite, transponder, and/or frequency to tune to. From tuners 115, tuning management processor 110-2 may receive transponder streams of packetized data. As previously detailed, some or all of these packets may include a PID that identifies the content of the packet.

Tuning management processor 110-2 may be configured to create one or more PID filters 155 that sort packets received from tuners 115 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 140 or another table, such as a program association table (PAT). From the PMT data packets, PMT may be constructed by tuning management processor 110-2.

PID filters 155 may be configured to filter data packets based on PIDs. In some embodiments, PID filters 155 are created and executed by tuning management processor 110-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 157). For example, if a transponder data stream includes multiple television channels, data packets corresponding to a television channel that is not desired to be stored or displayed by the user may be ignored by PID filters 155. As such, only data packets corresponding to the one or more television channels desired to be stored and/or displayed may be filtered and passed to either descrambling engine 165 or decryption processing component 160; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 140, may be appropriately routed by PID filters 155. At a given time, one or multiple PID filters may be executed by tuning management processor 110-2.

Descrambling engine 165 may use the control words output by decryption processing component 160 in order to descramble video and/or audio corresponding to television channels for storage and/or presentation. Video and/or audio data contained in the transponder data stream received by tuners 115 may be scrambled. Video and/or audio data may be descrambled by descrambling engine 165 using a particular control word. Which control word output by decryption processing component 160 to be used for successful descrambling may be indicated by a scramble control identifier present within the data packet containing the scrambled video or audio. Descrambled video and/or audio may be output by descrambling engine 165 to storage medium 125 for storage (in DVR database 145) and/or to decoder module 133 for output to a television or other presentation equipment via television interface 135.

For simplicity, television receiver 100 of FIG. 1 has been reduced to a block diagram; commonly known parts, such as a power supply, have been omitted. Further, some routing between the various modules of television receiver 100 has been illustrated. Such illustrations are for exemplary purposes only. The state of two modules not being directly or indirectly connected does not indicate the modules cannot communicate. Rather, connections between modules of the television receiver 100 are intended only to indicate possible common data routing. It should be understood that the modules of television receiver 100 may be combined into a fewer number of modules or divided into a greater number of modules. Further, the components of television receiver 100 may be part of another device, such as built into a television.

Figure 2:
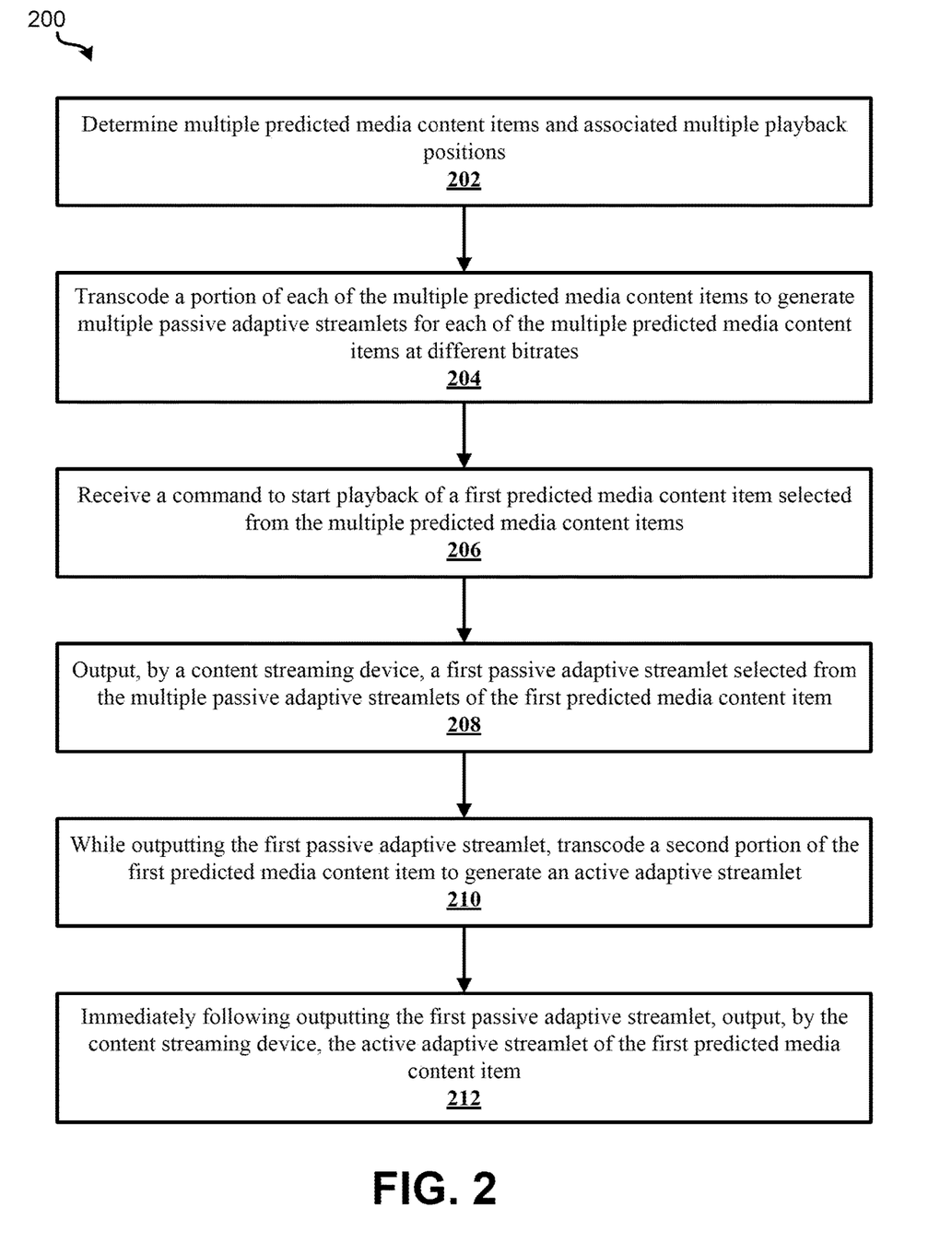
FIG. 2 illustrates an embodiment of a method for media content streaming.
Figure 3:
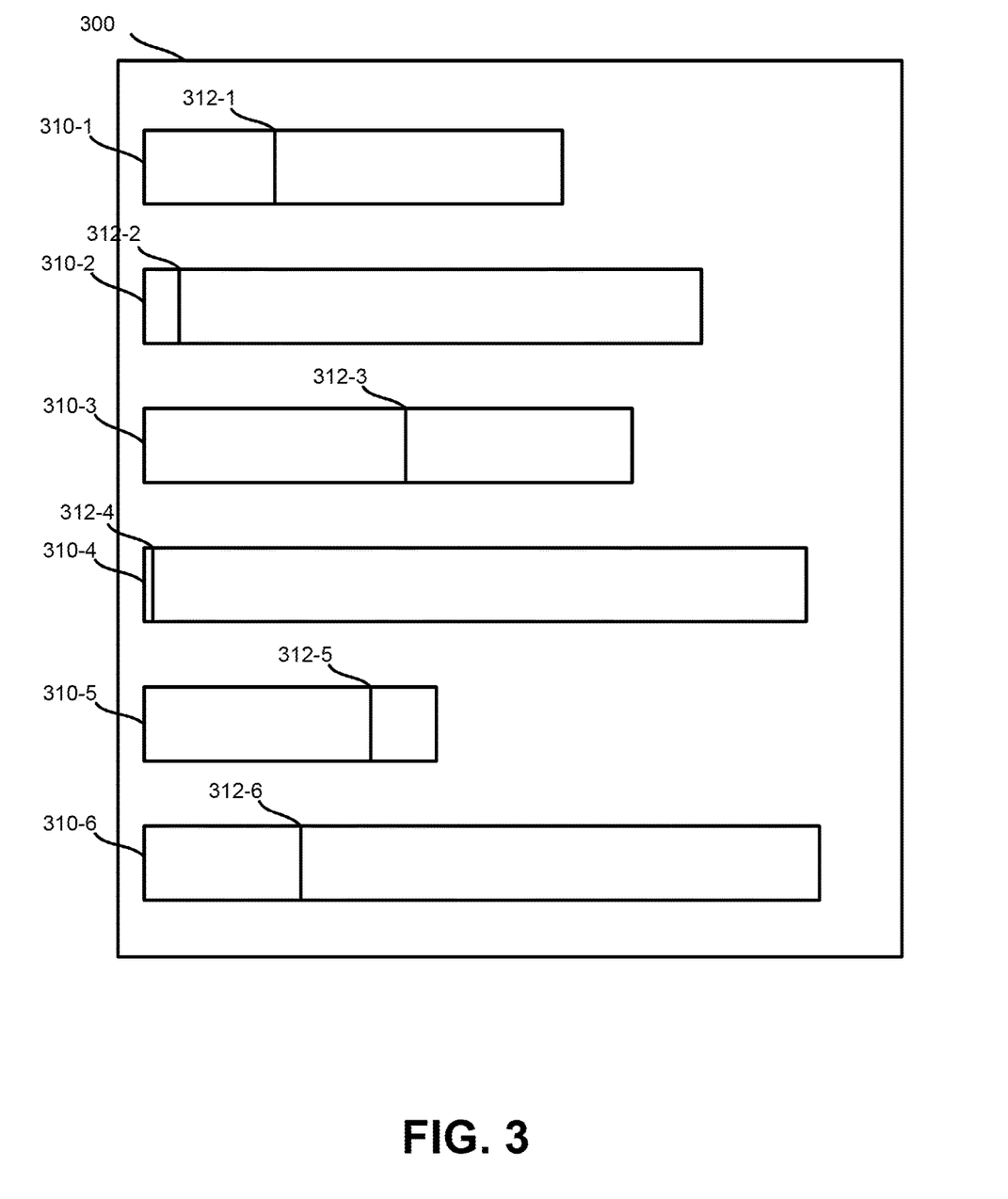
FIG. 3 illustrates an embodiment of a probable playback list (PPL).

FIG. 2 illustrates an embodiment of a method 200 for media content streaming. Method 200 may be performed using the system and/or device shown in FIG. 1. At block 202, multiple predicted media content items and associated multiple playback positions are determined. FIG. 3 illustrates an embodiment of a probable playback list (PPL). Probable playback list 300 includes a number of predicted media content items 310. In the example shown in FIG. 3, probable playback list 300 includes six predicted media content items 310-1, 310-2, 310-3, 310-4, 310-5, and 310-6, which are determined from many (e.g., hundreds of or thousands of) media content items stored on a content storage device (e.g., storage medium 125). These predicted media content items 310-1, 310-2, 310-3, 310-4, 310-5, and 310-6 are associated with the highest likelihood of being played by the user or viewer. In one implementation, all media content items stored on the content storage device are sorted based on the likelihood of being played by the user or viewer, and the top six on the list are selected. It should be understood that more or fewer predicted media content items 310 may be included in probable playback list 300 in other embodiments.

As discussed above, the predicted media content items 310 may be determined based on history data of the user, which may be stored in user history database 146 shown in FIG. 1. Machine learning techniques (e.g., neural network models) can be utilized to determine the predicted media content items 310. History data of the user may include one or more of the following: watch history; favorite genre; favorite program; favorite media content item provider; and playback pause positions. Watch history may be based on a particular day (e.g., Sunday) or a particular time (e.g., 7:00 pm to 9:00 pm), or a combination thereof (e.g., 7:00 pm to 9:00 pm on Sunday). Watch history may also be based on seasonal program watch history. It should be understood that history data of the user may include other types of data related to the user in other embodiments.

In some embodiments, a (predicted) playback position 312 is determined for each of these predicted media content items 310 in probable playback list 300. The playback position 312 is associated with the highest likelihood of being the start point of the playback. In the example shown in FIG. 3, playback position 312-1 is determined for predicted media content item 310-1; playback position 312-2 is determined for predicted media content item 310-2; playback position 312-3 is determined for predicted media content item 310-3; playback position 312-4 is determined for predicted media content item 310-4; playback position 312-5 is determined for predicted media content item 310-5; playback position 312-6 is determined for predicted media content item 310-6. As shown in FIG. 3, playback positions 312 may be located at different positions for different predicted media content items 310.

In some implementations, playback positions 312 are determined based on history data of the user, which may be stored in user history database 146 shown in FIG. 1. In one example, history data includes previous pause positions for each of these predicted media content items 310, and these previous pause positions are determined to be playback positions 312. These previous pause positions are associated with the highest likelihood of being the start point of the playback when the viewer or user wants to resume the playback. It should be understood the example above is not intended to be limiting, and other types of history data of the user may be used to determine playback positions 312 in other embodiments.

Figure 4:
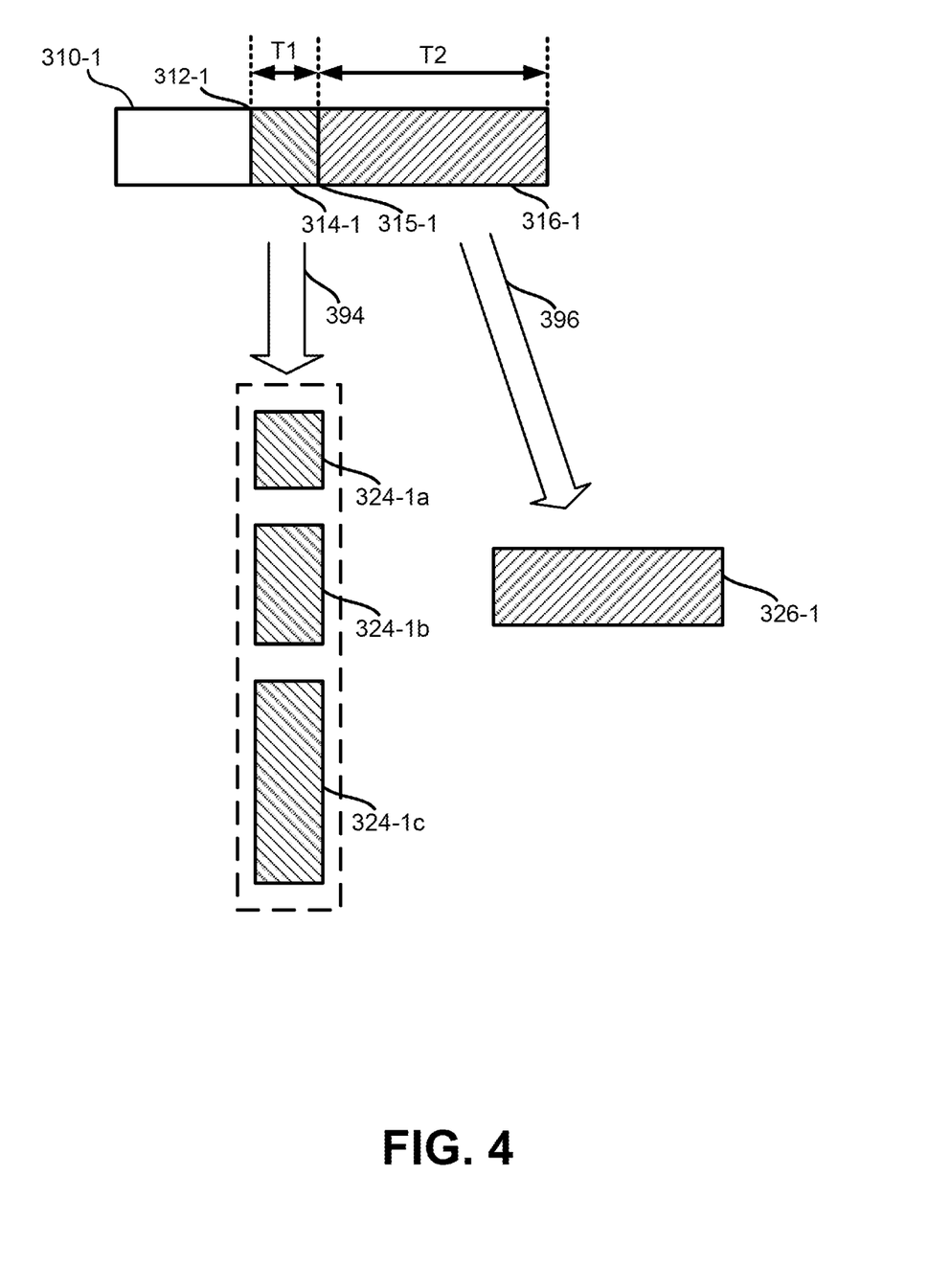
FIG. 4 illustrates an embodiment of generating multiple passive adaptive streamlets and an active adaptive streamlet.

At block 204, a portion of each of the multiple predicted media content items is transcoded to generate multiple passive adaptive streamlets for each of the multiple predicted media content items at different bitrates. FIG. 4 illustrates an embodiment of generating multiple passive adaptive streamlets and an active adaptive streamlet. In the example shown in FIG. 4, predicted media content item 310-1 is one of the predicted media content items 310 included in a probable playback list 300 shown in FIG. 3. It should be understood that although predicted media content item 310-1 is used as an example, the concept of generating multiple passive adaptive streamlets and an active adaptive streamlet is generally applicable to all predicted media content item 310 shown in FIG. 3.

In the example shown in FIG. 4, playback position 312-1 is determined for predicted media content item 310-1, and the remaining portion that starts from playback position 312-1 is the portion to be played when the user or viewer wants to start the playback of predicted media content item 310-1. The remaining portion includes a passive portion 314-1 and an active portion 314-2. Active portion 314-2 follows passive portion 314-1. Passive portion 314-1 starts at playback position 312-1 and ends at optimal transition point 315-1; active portion 316-1 starts at optimal transition point 315-1 and ends at the end of the predicted media content item 310.

Passive portion 314-1 has a duration of T1; active portion 316-1 has a duration of T2. Passive portion 314-1 is transcoded to generate, for example, three passive adaptive streamlets 324-1a, 324-1b, and 324-1c during the first transcoding process (sometimes also referred to as the "passive adaptive transcoding process") 394. These three passive adaptive streamlets 324-1a, 324-1b, and 324-1c are transcoded before the start of playback of predicted media content item 310 and stored in, for example, passive adaptive streamlet bank 131 shown in FIG. 1. These three passive adaptive streamlets 324-1a, 324-1b, and 324-1c are characterized by three different bitrates. In one example, passive adaptive streamlet 324-1b corresponds to a last streamed bitrate (i.e., the bitrate used in the immediately previous playback session by the user or viewer); passive adaptive streamlet 324-1a corresponds to a first bitrate having a lower bitrate than an average bitrate; passive adaptive streamlet 324-1c corresponds to a second bitrate having a greater bitrate than the average bitrate. In some embodiments, the three bitrates are chosen based on the bitrate history of the particular user or viewer. The bitrate history includes the last streamed bitrate, the average bitrate, and other information on bitrates used for this particular user or viewer. In some embodiments, the bitrate history of the particular user or viewer takes into account the distinctions among different content streaming devices (e.g., different smart TVs in a house) used by the particular user or viewer.

The last streamed bitrate is very likely to be a good fit since it was used in the immediately previous playback session, assuming that network conditions haven't changed dramatically since the immediately previous playback session. This may be the case when the user or viewer has not physically moved to another location, and the immediately previous playback session occurred not a long time ago (e.g., occurred ten minutes ago). The first bitrate may be a relatively lower bitrate, and passive adaptive streamlet 324-1a is, therefore, relatively small in data size. Consequently, using the first bitrate can ensure that the streaming can start smoothly, even under non-ideal network conditions. The playback can begin relatively sooner than if the passive adaptive streamlet was not present. The second bitrate may be a relatively higher bitrate, and passive adaptive streamlet 324-1c is, therefore, relatively large in data size. Consequently, using the second bitrate can provide a better streaming performance if network conditions allow so.

Different bitrates of passive adaptive streamlets 324 can be used to determine corresponding video resolutions used by the content streaming device. For example, the second bitrate, which is greater than the average bitrate, corresponds to a higher video resolution; the first bitrate, which is lower than the average bitrate, corresponds to a lower video resolution.

It should be understood that the example shown in FIG. 4 is exemplary instead of limiting, and fewer or more passive adaptive streamlets 324-1 can be generated in other embodiments. If more than three passive adaptive streamlets 324-1 are generated, more bitrate choices are created, however, at the cost of a larger storage volume.

In one implementation, passive portion 314-1 is transcoded by decoder module 133 of television receiver 100 shown in FIG. 1. In one example, passive portion 314-1 is transcoded by one or more of decoders 134-1, 134-2, 134-3 of decoder module 133 shown in FIG. 1. In one example, decoder 134-1 transcodes passive portion 314-1 and generates passive adaptive streamlet 341-1a; decoder 134-2 transcodes passive portion 314-1 and generates passive adaptive streamlet 341-1b; decoder 134-1 transcodes passive portion 314-1 and generates passive adaptive streamlet 341-1a.

In one embodiment, passive portion 314-1 is transcoded to generate passive adaptive streamlets 324-1a, 324-1b, and 324-1c when the content storage device (e.g., TV receiver 100 shown in FIG. 1) is idle. In other words, transcoding passive portions 314 for each of predicted media content items 310 occurs when the content storage device is idle. All available decoders (e.g., decoders 134-1, 134-2, 134-3 of decoder module 133) can be assigned by, for example, adaptive streaming smooth transition engine 111 of control processor 110-1 shown in FIG. 1 accordingly to transcode passive portion 314-1 to generate passive adaptive streamlets 324-1. Although passive portion 314-1 is discussed as an example, it should be understood that all passive portions 314 can be transcoded when television receiver 100 is idle. As such, the first transcoding process 394 may not consume resources when television receiver 100 is busy handling other tasks, such as tuning, decryption, descrambling, and the like.

In addition, duration T1 of passive portion 314-1 is greater than a predetermined threshold. The predetermined threshold is determined based on network conditions. The predetermined threshold is determined to be larger than the time it takes to get ready for the streaming (including the time to start the streaming engine, the time to transcode the media content item, the time to transmit the transcoded streamlet to the content streaming device 190 shown in FIG. 1, and the like). In some examples, the time it takes to get ready for the streaming is about three seconds, and the predetermined threshold may be determined to be three seconds. Duration T1 is, therefore, larger than three seconds (e.g., ranging from about five seconds to about seven seconds). In some embodiments, duration T1 remains the same for all predicted media content items 310. In other embodiments, duration T1 varies for each predicted media content item 310.

At block 206, a command to start playback of a first predicted media content item is received. The command is generated by the user or viewer using, for example, user input device 150 shown in FIG. 1. The user or viewer wants to start playback of the first predicted media content item (e.g., predicted media content item 310-1) selected from all these predicted media content items 310 included in probable playback list 300 shown in FIG. 3.

At block 208, a first passive adaptive streamlet is output by a content streaming device. The first passive adaptive streamlet (e.g., passive adaptive streamlet 324-1b shown in FIG. 4) is selected from all available passive adaptive streamlets (e.g., passive adaptive streamlet 324-1 shown in FIG. 4), which have been transcoded in advance and stored in passive adaptive streamlet bank 131 shown in FIG. 1. As such, the streaming of passive portion 314-1 can start immediately after receiving the command from the user or viewer without any delay. The streaming start time is significantly reduced.

In some embodiments, the first passive adaptive streamlet is selected to be passive adaptive streamlet 314-1b, corresponding to the last streamed bitrate. In other embodiments, the first passive adaptive streamlet is selected to be passive adaptive streamlet 314-1a, corresponding to the first bitrate, which is lower than the average bitrate. This may occur when the immediately previous streaming session experiences a significant bitrate fluctuation and several bitrate drops (i.e., dropping to a lower bitrate several times). In some embodiments, the first passive adaptive streamlet is selected to be passive adaptive streamlet 314-1c, corresponding to the second bitrate, which is higher than the average bitrate.

In some embodiments, passive adaptive streamlets 324 may be deleted to release storage of storage medium 125 shown in FIG. 2 when predicted media content item 310-1 has been played entirely. In other embodiments, passive adaptive streamlets 324 may be stored even after predicted media content item 310-1 has been played entirely. This may occur when it is determined by, for example, control processor 110-1 that predicted media content item 310-1 is very likely to be played again in the future.

At block 210, an active adaptive streamlet of the first predicted media content item is generated while the first passive adaptive streamlet is being output. The active adaptive streamlet is generated by transcoding a second portion (sometimes also referred to as an "active portion") of the first predicted media content item during a second transcoding process 396. In the example shown in FIG. 4, active portion 316-1 is transcoded by, for example, decoder module 133 of television receiver 100 shown in FIG. 1. In one example, active portion 316-1 is transcoded by one of decoders 134-1, 134-2, 134-3 of decoder module 133 shown in FIG. 1. In some embodiments, the bitrate of the active adaptive streamlet 326 is the same as the bitrate of the first passive adaptive streamlet 324-1b.

Since the first passive adaptive streamlet 324-1b is still being output by content streaming device 190 shown in FIG. 1 for duration T1, at least a portion of active portion 316 has been transcoded when the first passive adaptive streamlet 324-1b is output. In other words, active adaptive streamlet 326-1 does not have to be completely generated when the first passive adaptive streamlet 324-1b is output. In some cases where duration T2 of active portion 316-1 is relatively short, active adaptive streamlet 326-1 may have been completely generated when the first passive adaptive streamlet 324-1b is output.

At block 212, the active adaptive streamlet of the first predicted media content item is output immediately following outputting the first passive adaptive streamlet. Since active adaptive streamlet 326 is output immediately following outputting first passive adaptive streamlet 324-1b, the transition from passive portion 314-1 to active portion 316-1 of predicted media content item 310 becomes smooth. In one embodiment, active adaptive streamlet 326-1 is injected in a streaming buffer following first passive adaptive streamlet 324-1b.

In some embodiments, optimal transition point 315-1 is determined based at least on a group of pictures (GOP) boundary and an I-frame of predicted media content item 310-1. I-frames are generally inserted to designate the end of a GOP or a video segment. Because I-frame compression is not dependent on previously-encoded pictures, it can "refresh" the video quality. Encoders are typically tuned to prioritize the encoding of I-frames in terms of size and quality because I-frames play a critical role in maintaining video quality. After encoding an I-frame with high video quality, the encoder can then use it as a reference picture to compress P and B-frames. It should be understood that optimal transition point 315-1 is also selected to make sure duration T1 of passive portion 314-1 is greater than the predetermined threshold, as discussed above.

Referring back to FIG. 4, optimal transition point 315-1 is determined to be a next immediate I-frame available in the stream of predicted media content item 310-1. Thus, the first output frame of the active adaptive streamlet 326 is the next immediate I-frame available. When passive adaptive streamlet 324 is generated, first transcoding process 394 stops exactly before the next immediate I-frame available. As such, active adaptive streamlet 326 can start from the next immediate I-frame available. It should be understood that optimal transition point 315-1 does not mean the objectively optimal point, and there could be more than one optimal transition points 315-1 to be selected.

In some embodiments, the first passive adaptive streamlet 324-1b and active adaptive streamlet 326-1 correspond to different streaming container formats, such as MEPG-4 Part 14 (MP4), MPEG Transport Stream (MPEG-TS), etc. The data parser of content streaming device 190 shown in FIG. 1 can detect the container formats of the first passive adaptive streamlet 324-1b and active adaptive streamlet 326-1 and create the corresponding decoding pipelines. For example, the first passive adaptive streamlet 324-1b can be in HLS (HTTP Live Streaming) format, and active adaptive streamlet 326-1 can be in DASH (Dynamic Adaptive Streaming over HTTP) format. The continuity of the packaging parameters has to be maintained for the smooth transition from passive portion 314-1 to active portion 316-1. Otherwise, content streaming device 190 shown in FIG. 1 may detect discontinuity and execute discontinuity failover recovery.

To avoid this situation, the media-related metadata like audio and video parameters has to be shared between the first passive adaptive streamlet 324-1b and active adaptive streamlet 326-1 to have a smooth transition in the video frames. Two decoding pipelines may be engaged to avoid interruption or discontinuity in A/V output. In one implementation, metadata are stored along with passive adaptive streamlets 324 in, for example, passive adaptive streamlet bank 131 shown in FIG. 1. For video content items, metadata includes one or more of video transcoding parameters, such as resolution, bitrate, last continuity counter, last segment ID, timestamp, etc. For audio content items, metadata includes one or more of audio transcoding parameters, such as sampling rate, bitrate, last continuity counter, last segment ID, timestamp, etc. These video or audio transcoding parameters included in the metadata are then utilized when generating active adaptive streamlet 326. As such, transcoding parameters for passive adaptive streamlets 324 and active adaptive streamlet 326 are more likely to be aligned with each other. For example, if the bitrate of the first passive adaptive streamlet 324-1b is 3 Mbps, then the bitrate of active adaptive streamlet 326-1 should also start with 3 Mbps for smooth transition and be adjusted later based on factors such as network conditions. Therefore, a smooth transition from passive portion 314-1 to active portion 316-1 can be facilitated. Once the transition is completed, transcoding of active portion 316 may continue to happen in real-time until playback of predicted media content item 310-1 either ends or is stopped.

In some embodiments, the first passive adaptive streamlet 324-1b and active adaptive streamlet 326-1 correspond to the same streaming container format. To use the same decoding pipeline, container-specific metadata has to be shared along with media-related metadata. For example, in the case of DASH format, active adaptive streamlet 326 has to sequentially continue the "segment id." Otherwise, discontinuity is introduced. In another example, in the case of the TS format, the continuity counter has to be sequentially maintained. Otherwise, TS data parser finds the discontinuity and skips the A/V data till the next I-frame.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for media content streaming, the method comprising:
receiving a command to start playback of a first media content item, wherein a first portion of the first media content item has been transcoded to generate at least one passive adaptive streamlet, and the first portion of the first media content item starts at a playback position and ends at an optimal transition point;

outputting, by a content streaming device, one of the at least one passive adaptive streamlet;

while outputting the one of the at least one passive adaptive streamlet, requesting, receiving, and transcoding a second portion of the first media content item to generate an active adaptive streamlet of the first media content item, wherein the active adaptive streamlet starts at the optimal transition point of the first media content item; and immediately following outputting the one of the at least one passive adaptive streamlet, outputting, by the content streaming device, the active adaptive streamlet of the first media content item.

2. The method of claim 1, wherein the at least one passive adaptive streamlet are three passive adaptive streamlets.

3. The method of claim 2, wherein the three passive adaptive streamlets correspond to a last streamed bitrate, a first bitrate having a lower bitrate than an average bitrate, and a second bitrate having a greater bitrate than the average bitrate.

4. The method of claim 3, wherein the one of the at least one passive adaptive streamlet corresponds to the last streamed bitrate.

5. The method of claim 3, wherein the one of the at least one passive adaptive streamlet corresponds to the first bitrate.

6. The method of claim 3, wherein the one of the at least one passive adaptive streamlet corresponds to the second bitrate.

7. The method of claim 1, wherein the at least one passive adaptive streamlet includes one passive adaptive streamlet.

8. The method of claim 1, wherein the optimal transition point is determined based at least on a group of pictures (GOP) boundary and an I-frame of the first media content item.

9. The method of claim 8, wherein the optimal transition point is a next immediate I-frame of the first media content item.

10. The method of claim 1, wherein a duration of a period between the playback position and the optimal transition point is greater than a predetermined threshold.

11. The method of claim 10, wherein the predetermined threshold is determined based on network conditions.

12. The method of claim 1, wherein the second portion of the first media content item is transcoded by one or more transcoders of a television receiver when the one or more transcoders are idle.

13. The method of claim 1, further comprising:
selecting the first media content item from a plurality of predicted media content items.

14. The method of claim 13, further comprising:
determining the plurality of predicted media content items and a plurality of playback positions corresponding to the plurality of predicted media content items, from a plurality of media content items, based on history data of a user.

15. The method of claim 14, wherein the plurality of predicted media content items and the plurality of playback positions are determined using machine learning.

16. The method of claim 14, wherein the history data of the user comprises one or more of the following:
watch history;
favorite genre;
favorite program;
favorite media content item provider; and
playback pause positions.

17. The method of claim 1, further comprising:
storing metadata of the at least one passive adaptive streamlet, wherein the metadata is used when generating the active adaptive streamlet.

18. A system for media content streaming, the system comprising:
a storage medium storing a plurality of media content items comprising a first media content item;
a decoder module;
a content streaming device; and
one or more processors, wherein the system is configured to:
receive a command to start playback of a first media content item, wherein a first portion of the first media content item has been transcoded, by the decoder module, to generate at least one passive adaptive streamlet, and the first portion of the first media content item starts at a playback position and ends at an optimal transition point;
output, by the content streaming device, one of the at least one passive adaptive streamlet;
while the one of the at least one passive adaptive streamlet is output, transcode, by the decoder module, a second portion of the first media content item to generate an active adaptive streamlet of the first media content item, wherein the active adaptive streamlet starts at the optimal transition point of the first media content item; and
immediately following outputting the one of the at least one passive adaptive streamlet, output, by the content streaming device, the active adaptive streamlet of the first media content item.

19. The system of claim 18, wherein the optimal transition point is determined based at least on a group of pictures (GOP) boundary and an I-frame of the first media content item.

20. The system of claim 18, wherein the optimal transition point is a next immediate I-frame of the first media content item.

* * * * *